United States Patent [19]
Gale et al.

[11] Patent Number: 5,257,539
[45] Date of Patent: Nov. 2, 1993

[54] ELECTRONIC OIL LEVEL INDICATOR

[76] Inventors: Danny E. Gale, 9-6207 44 St., Lloydminster, Alta, Canada, T9V 1V8; George Spector, 233 Broadway-Room 702, New York City, N.Y. 10279

[21] Appl. No.: 888,346

[22] Filed: May 21, 1992

[51] Int. Cl.⁵ .................................. G01F 23/28
[52] U.S. Cl. ........................ 73/293; 250/577; 250/901; 184/108; 123/196 S
[58] Field of Search ............... 73/293; 250/577, 900, 250/901, 902, 903, 904, 905, 906, 907; 184/108; 123/196 S

[56] References Cited
U.S. PATENT DOCUMENTS

| | | | |
|---|---|---|---|
| 2,256,595 | 9/1941 | Metcalf | 250/902 |
| 3,120,125 | 2/1964 | Vasel | 73/293 |
| 3,548,657 | 12/1970 | Panerai et al. | 73/293 |
| 3,713,338 | 1/1973 | Kind | 73/293 |
| 3,794,428 | 2/1974 | Giesecke | 73/293 |
| 4,119,860 | 10/1978 | Gooley | 250/577 |
| 4,354,180 | 10/1982 | Harding | 250/577 |
| 4,355,238 | 10/1982 | Quell | 73/293 |
| 4,425,794 | 1/1984 | Duesbury | 73/293 |
| 4,857,894 | 8/1989 | Dahl | 73/293 |
| 4,954,724 | 9/1990 | Koda et al. | 73/293 |

FOREIGN PATENT DOCUMENTS

| | | | |
|---|---|---|---|
| 0058056 | 8/1982 | European Pat. Off. | 73/293 |
| 0145574 | 11/1979 | Japan | 73/293 |
| 0190224 | 11/1982 | Japan | 73/293 |
| 0019512 | 2/1983 | Japan | 73/293 |

*Primary Examiner*—William A. Cuchlinski, Jr.
*Assistant Examiner*—Diego F. F. Gutierrez

[57] ABSTRACT

An electronic oil level indicator is provided to show the amount of oil in an oil pan of an internal combustion engine which consists of a perforated housing positioned in the oil pan, so that the oil in the oil pan will enter the housing. A mechanism is connected to the housing for producing light. A fiber optic bundle has a first end connected to the housing spaced away from the light producing mechanism within the oil. A display panel is remotely located from the housing with a second end of the fiber optic bundle connected thereto. The height level of the oil will control the amount of illumination from the light producing mechanism reaching the fiber optic bundle which in turn is carried to the display panel to allow a person to visually check the oil level on the display panel.

1 Claim, 1 Drawing Sheet

ELECTRONIC OIL LEVEL INDICATOR

BACKGROUND OF THE INVENTION

The instant invention relates generally to automotive oil gauges and more specifically it relates to an electronic oil level indicator, which provides an optical mechanism to check the oil level in an oil pan.

There are available various conventional automotive oil gauge which do not provide the novel improvements of the invention herein disclosed.

SUMMARY OF THE INVENTION

A primary object of the present invention is to provide an electronic oil level indicator that will overcome the shortcomings of the prior art devices.

Another object is to provide an electronic oil level indicator in which an optical mechanism in conjunction with an oil pan in an internal combustion engine can monitor the oil, so that the amount of oil within the oil pan can be visually seen on a dashboard of a motor vehicle.

An additional object is to provide an electronic oil level indicator in which the optical mechanism can be placed into an existing conventional oil pan or be built into the oil pan by being a plug-in type.

A further object is to provide an electronic oil level indicator that is simple and easy to use.

A still further object is to provide an electronic oil level indicator that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

DETAILED DESCRIPTION OF THE PREFERRED EMBODIMENTS

Figure 1:
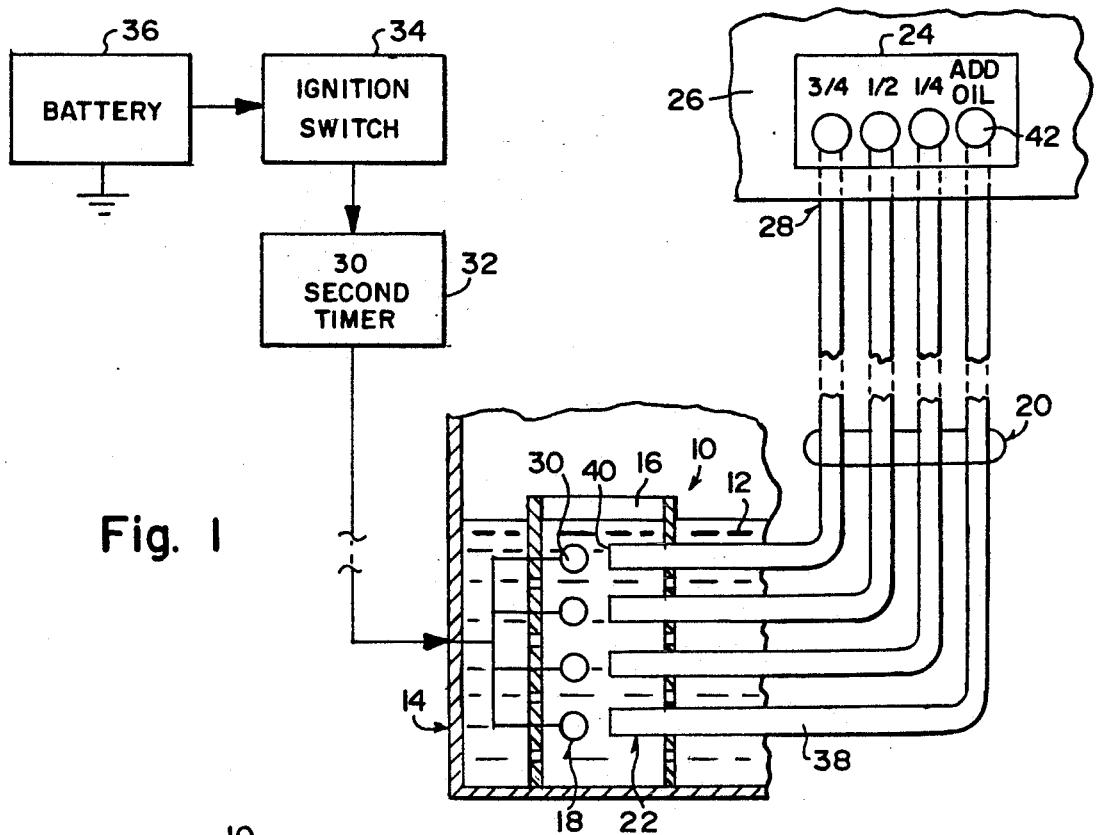
FIG. 1 is a diagrammatic schematic diagram partly in cross section, showing the various components of the instant invention installed in a motor vehicle.

Turning now descriptively to the drawings, in which similar reference characters denote similar elements throughout the several views, the Figures illustrate an electronic oil level indicator 10 to show the amount of oil 12 in an oil pan 14 of an internal combustion engine, which consists of a perforated housing 16 positioned in the oil pan 14, so that the oil 12 in the oil pan 14 will enter the housing 16. A mechanism 18 is connected to the housing 16 for producing light. A fiber optic bundle 20 having a first end 22 connected to the housing 16, is spaced away from the light producing mechanism 18 within the oil 12. A display panel 24 is remotely located from the housing 16, such as on a dashboard 26, with a second end 28 of the fiber optic bundle 20 connected thereto. The height level of the oil 12 will control the amount of illumination from the light producing mechanism 18 reaching the fiber optic bundle 20, which is carried to the display panel 24 to allow a person to visually check the oil level on the display panel 24.

The light producing mechanism 18 includes at least one light-emitting diode 30 mounted on the interior surface of the housing 16 away from the fiber optic bundle 20. A timer 32 is electrically connected between the at least one light-emitting diode 30 and an ignition switch 34, which is electrically connected to a battery 36, to operate the at least one light-emitting diode 30 during a predetermined time interval.

The fiber optic bundle 20 includes a plurality of vertically spaced apart very fine transparent elongated threads 38, each having the ability to transmit light with an extremely low loss of the light, from a first end 40 at the housing 16 to a second end by a process of total reflection.

Figure 3:
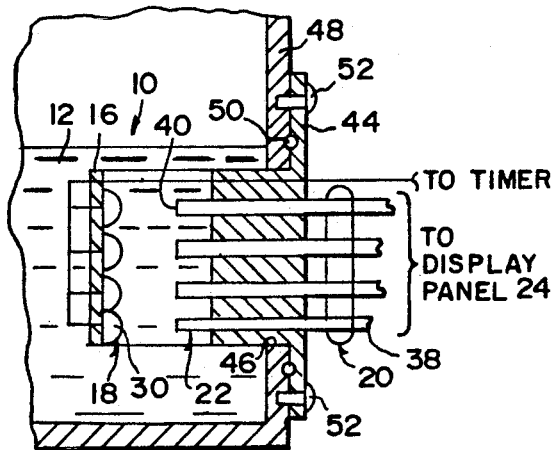
FIG. 3 is a diagrammatic schematic diagram partly in cross section of a portion of a third embodiment, showing a plug in type of housing for the components used in FIG. 1.

In the electronic oil level indicator, as shown in FIG. 3, the housing 16 is a plug-in type that further includes a flange 44 formed on one end thereof, so that the housing 16 can be inserted horizontally with respect to a bottom wall of the oil pan through an aperture 46 in a wall 48 of the oil pan 14 with the flange 44 bearing against the wall 48. A seal member 50 is placed between the flange 44 and the wall 48 of the oil pan 14. Fasteners 52 extend through the flange 44 and into the wall 48 of the oil pan 14 for securing the plug-in housing 16 to the wall 48 of the oil pan 14. In this configuration the housing 16 can be removed and replaced when necessary.

Figure 2:
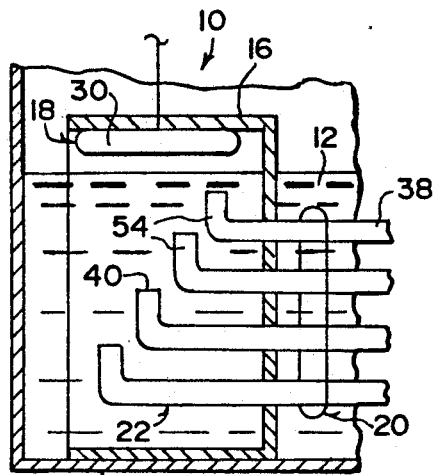
FIG. 2 is a diagrammatic schematic diagram partly in cross section of a portion of a second embodiment of a more simplified version, as shown in FIG. 1, using only one LED and a four thread fiber optic bundle.

The drawings show four elongated threads 38, which can be typically but not limited thereto, used in the fiber optic bundle 20 to illuminate at the display panel 24 the indicia "¾", "½", "¼", "ADD OIL". In FIGS. 1 and 2 four light-emitting diodes 30 are utilized for illuminating the four elongated threads 38. In FIG. 2 a slightly different configuration is shown. One elongated light-emitting diode 30 is used mounted to the housing 16 above the top surface of the oil 12. Each of the elongated threads 38 are spaced apart at different levels within the oil 12 and bent at ninety degree angles 54 at their ends 40 to face upwardly under the elongated light-emitting diode 30. When the oil level drops the light from the elongated light-emitting diode 30 will enter each end 40 at different intervals to indicate the drop in the oil 12.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. An electronic oil level indicator for an oil pan comprising:
   a) a perforated housing;
   b) a flange formed on one end of said housing, so that said housing can be inserted horizontally with respect to a bottom wall of the oil pan through an aperture in a wall of said oil pan with said flange bearing against said wall;

c) a seal member placed between said flange and said wall of the oil pan;
d) means for securing said flange to said oil pan;
e) said housing having a vertical channel extending therethrough;
f) a vertical wall on an opposite end of said housing with vertically spaced light producing means in said channel mounted on said vertical wall of said housing and
g) corresponding vertically spaced light receiving means, aligned with said light producing means, said receiving means mounted through said flange extending into said channel and connected electrically to a visual display panel.

* * * * *